Patented Feb. 7, 1939

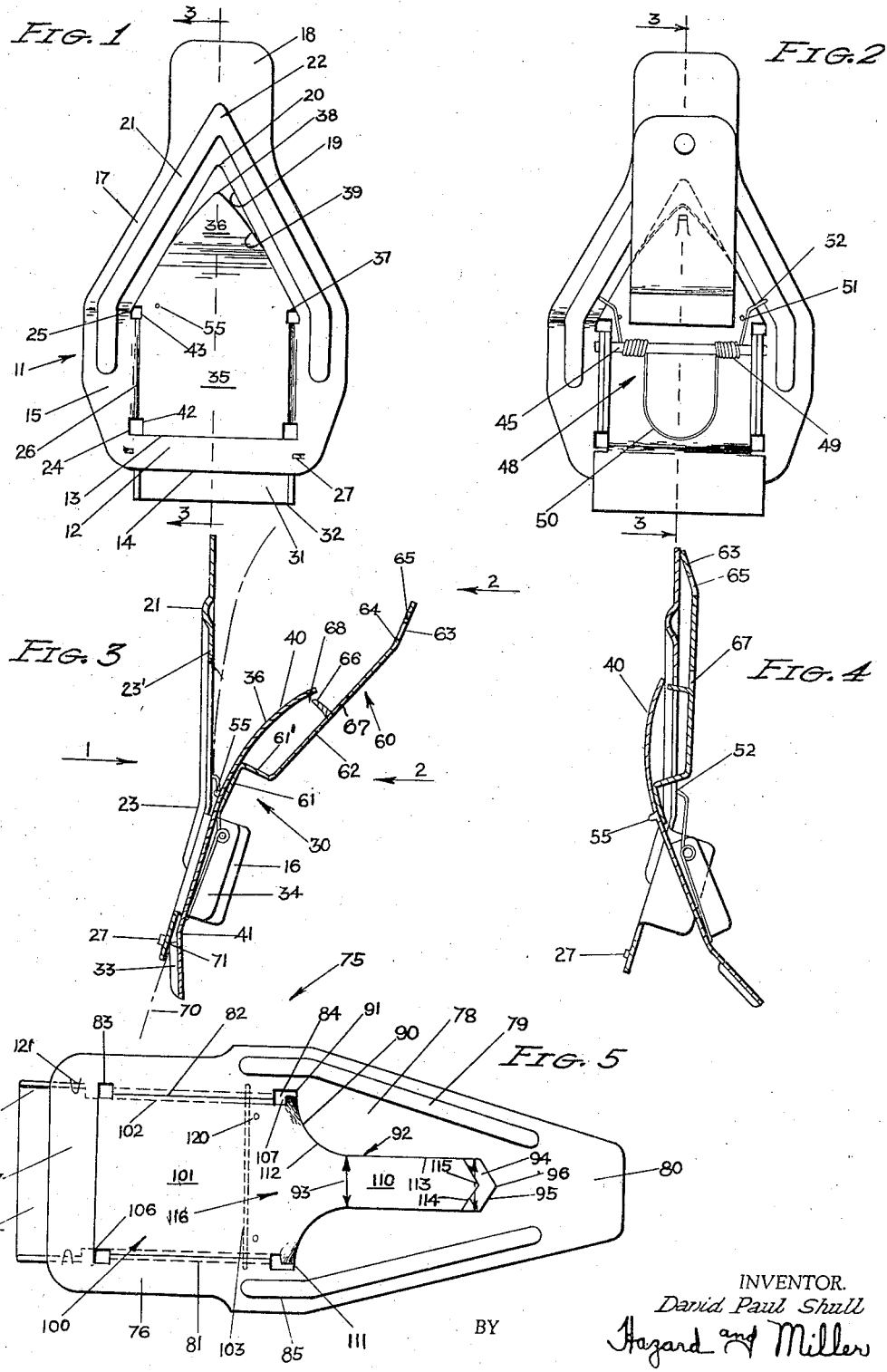
Feb. 7, 1939.  D. P. SHULL  2,146,196
FILM CUTTER FOR MAGAZINE CAMERAS
Filed Oct. 6, 1937
INVENTOR.
David Paul Shull
BY Hazard and Miller
ATTORNEY.

2,146,196

UNITED STATES PATENT OFFICE 2,146,196

FILM CUTTER FOR MAGAZINE CAMERAS

David Paul Shull, Los Angeles, Calif.

Application October 6, 1937, Serial No. 167,635

7 Claims. (Cl. 30—229)

My invention relates to a film cutter especially designed to cut a length of film from a long roll so that the length cut from such roll may be threaded and wound on a spool or the like for use in the magazine camera. The film cutter cuts a tongue-like end on the film so that such end may be engaged with the spool of the camera. In the type of film usually used for these magazine cameras, the film has the characteristic of being panchromatic and thus in a dark room cannot be exposed to a red or ruby light or to any illumination of other colors or white light as this would cause an exposure of the film. Therefore the film must be cut or severed from the large roll in absolute darkness. Hence the operator can only accomplish this by sense of touch or feel of the film and the cutting implement. My invention therefore is to provide a simple construction of film cutter so that the film may be readily guided solely by the sense of touch through the cutter and severed to form a suitable shape end projection or tongue for engaging the spool of the magazine camera. As these films are somewhat tough, it is necessary, to obtain a clean severing cut, that this be formed somewhat in the manner of a gradual shearing action commencing at one or both sides of the film and preferably simultaneously, the cut being initiated at both sides and progressing in a gradual shearing action until the film is completely severed and the proper shape end projection or tongue is formed.

A characteristic of my improved cutter includes what may be termed a relatively fixed template having inside cutting edges and pivoted to this template I employ a combination guiding and severing blade, the blade and the template having complementary handles or finger grips to develop the pivoting action of the cutter in relation to the template. The cutter is provided with outside cutting edges so shaped that in conjunction with the template they develop a shearing action.

As the type of film used generally has a series of perforations adjacent the marginal edges for guiding and feeding the film in the camera, I make use of these perforations to center and guide the film over the cutter plate or blade. A spring interacting between the cutter blade and the template normally holds these elements in their open position providing a space for the passage of the film between rear end portions of the template and the cutter blade. Then when the film has been fed to a sufficient amount through this guide and centered by projecting studs on the cutter blade engaging a pair of opposite perforations, the film will then be properly located between the template and the cutter blade. This can all be readily ascertained by touch. Then by operation by the fingers the cutter blade may be rotated on its pivot to the template to shear the film by the interaction of the outside cutting edges on the blade and the inside cutting edges on the template. These edges, as above mentioned, have the characteristic of developing a shear cut.

Another characteristic of my invention comprises the template as to the portion having inside cutting edges being in a plane and the cutter blade having at least a portion of its outside cutting edges formed on a curve to thereby initiate and develop a shearing action starting from opposite sides of the film. In one form of my invention the film may be cut with a V shaped tongue or projection in which case the cutter blade is V shaped and has a convex curve from its apex which is in the axial center of the film to the base of the blade opposite the side portions which initiate the shearing action. In this construction the internal cutting edges of the template are also V shaped.

In another form of my invention the template has inside cutting edges to form an elongated tongue with substantially parallel sides, the tongue being of considerably less width than the total width of the film. The tip end of the tongue terminates in a blunt V shaped end. The cutter blade is formed with a complementary shaped tongue spreading at the base of the tongue by a concave curve to the two marginal edges of the film. In this type of cutter the tongue of the blade may be substantially plane with a slight downturned convex curvature at the V shaped end. However to initiate the shearing action from the sides of the film the concave curve from the tongue to the side of the cutter blade has at each side a slightly upwardly dished edge developing a concave curve considered transversely and as to the upper surface. This produces side points or projections which develop an initial shearing action from the opposite sides of the film and when the blade including its tongue is brought into operative engagement with the inside cutting edges of the template, which as above mentioned are preferably in the same plane, a continuing shearing action acts on the film to sever the film and form the elongated tongue.

My invention is illustrated in connection with the accompanying drawing, in which:

Fig. 1 may be considered as a plan of one form of my cutter taken in the direction of the arrow Fig. 2 may be considered as an underside reverse plan taken in the direction of the arrow 2 of Fig. 3.

Fig. 3 is a longitudinal section of Fig. 1 in the...

longitudinally. The finger grip ends are thus pressed together until they come in contact as shown in Fig. 4 which forms the limit to the movement and this brings the apex end 38 of the cutter tongue completely past the apex 20 of the template edges 19 and thus completes the shearing action on the film, separating the film in two distinct parts, one of which has a V-shaped tongue formed on its end. This is the end used to thread the length of film on a spool of the magazine camera. The upwardly pressed nubs 27 have the ultility of forming a touch guide for the fingers when the operator is working in complete darkness with the cutter and film in centering the end of the film, passing this between the rims 33, also the underside of these nubs being pressed upwardly to form a slight recess for the forward end 71 of the rims. In addition these nubs may be utilized as a film guide by passing the film over the top of the strap 12 of the template instead of under this strap, in which case the film may be held in close contact with the center portion 35 of the blade plate by the finger with the nubs 55 engaging in perforations along the marginal edges of the film, but in either case the shearing action is substantially the same.

The construction of Fig. 5 involves mainly charges necessitated by the shape of tongue to be cut or formed on the film for threading in the spool of a magazine camera. This modification therefore has elements structurally and somewhat functionally equivalent to those of the device of Figs. 1 through 4. In this the template structure may be designated by the numeral 75 having side bars 76, a rear transverse strap 77, side arms 78 provided with an upset strengthening rib 79, a finger grip or handle end 80. Adjacent the side bars there are a pair of opposite ears 81 similar to the ears 16. The inside face of the ears forms a joint line 82. In this construction there are a pair of opposite outwardly extending notches 83 adjacent the end strap 12, a second pair of outwardly extending notches 84. There is a slight obtuse bend adjacent the portion marked 85 somewhat similar to the obtuse angle bend shown in Fig. 3 for the template.

The template however is provided with a different shape of cutting edges. Adjacent the notches 84 the side arms are provided with an inside cutting edge 90, this being convex, the curve commencing at the point 91 on the outer side of the notch 84 and continuing in a sweeping curve to two opposite tangential cutting edges 92. These converge slightly, the measurement distance 93 being but slightly greater than the measurement distance 94 at the ends of these edges. There are then two converging cutting edges 95 leading to an apex 96 which is preferably an obtuse angle and is in the axial line of the template. The cutting edges 90, 92 and 95 are symmetrical as regards the axial center of the template. The side arm portions 78 at the cutting edges are in a single plane.

The cutter blade assembly designated 100 has a central portion 101 with downwardly pressed ears 102 pivoted to the ears of the template on a pintle pin 103. This with the spring assembly for holding the blade assembly and template in an open position is substantially the same as shown in Figs. 2, 3 and 4. The blade structure has a rear end plate 104 with upwardly turned rims 105 forming guide rims for the film. The blade portion is cut with a pair of inwardly extending notches 106 aligning with the notches 83 and a second pair of inwardly extending notches 107 aligning with the notches 84. The cutting or shearing tongue 110 starts from two side points 111 at the notch 107 and these are slightly turned upwardly forming a concave curve on the upper surface. The tongue then has an outer concave curve 112 corresponding in shape to the inside curve 90 of the template and is then provided with two longitudinally extending outside cutting edges 113 slightly tapered to co-act with the inside edges 92. The outer end of the cutter tongue has converging cutting edges 114 meeting at an apex 115. In this construction there is preferably a slight downward obtuse angle between the center part 101 of the blade and the cutter tongue 110, this obtuse angle being at substantially the portion 116 in line with the cutter points 111. The rest of the tongue is preferably in a plane surface except for a slight downturn near the apex 115.

This type of cutter blade assembly is provided with an operating handle similar to the handle 60 detailed particularly in Figs. 3 and 4. There is also provided a stop finger similar to the stop finger 66. Film centering nubs 120 are located on the blade to engage in perforations on opposite sides of a film. There are also upwardly pressed guide nubs 121 on the transverse rear strap of the template.

In the operation of the construction of Fig. 5, the film may be fed between the end 77 of the template and the end 104 of the blade being guided by the rims 105 or it may be fed over the top of the end strap 77 and guided by the nubs 121. The template and blade tongue are normally held in a spaced position similar to that of Fig. 3 by the spring so that the film may be fed between these parts, the perforations of the film being centered over the nubs 120. When the device is actuated in cutting the film by for instance pressing the handle of the cutter blade towards the handle end of the template, the upwardly and outwardly projecting marginal points 111 give a shearing action from opposite sides of the film and the initial points of the curve 90 of the template and the concave curve 112 of the tongue develops an initial cut approximately transverse to the film. The cut is then continued on the co-acting cutting edges 90 of the template and 112 of the blade. The cut then merges into a shearing cut between the internal edges 92 of the template and the external edges 113 of the tongue 110. The final cut is developed by the interacting edges 95 of the template and 114 of the tongue. It will be seen therefore that this construction provides the film with an elongated slightly tapering tongue corresponding approximately in shape to the cutting edges of the template. It will appear that on account of the simplicity of the construction and the similarity to that of Figs. 1 through 4 that a cutter of this type may also be used in an absolute dark room on panchromatic or similar films.

It is to be noted that the shear in the first action on the film develops from outside the side edges of film. This is caused in the construction of Fig. 1 by the outer points 37 of the shearing tongue 36 being located beyond the side edges of the film which side edges are confined by the joint line 26 between the ears 16 and 34 of the platen and the blade assembly. In the construction of Fig. 5 the points 111 likewise are positioned beyond the outside edge of the film, such edge being confined by the joint line 82. Therefore the initial cut is started on the two outside edges of the film. In the construction of Fig. 1 the cut is formed by a shearing action from the opposite sides to the apex forming the V shaped tongue on the film. In the construction of Fig. 5 the shear first develops by the slight up curl adjacent the points 111 of the shearing tongue of the blade and operates along the curved lines joining the tongue portion and ends with the V shaped end shear. In some cases it is desirable to secure the device to a bench or table which may be done by inserting a screw through the perforation or eye 65. This attaches the blade assembly securely to the bench and the platen may be placed downwardly to develop the shearing action.

Various changes may be made in the details of the construction without departing from the spirit or scope of the invention as defined by the appended claims.

I claim:

1. In a device as described, a template having an opening defined at the rear portion by a transverse strap, side bars with ears defining parallel side edges of the opening and side arms defining inside cutting edges remote from the side of the opening defined by the rear strap, a blade assembly having a central portion, a pivotal connection between the said central portion and the ears of the side bars of the template, the said central portion being spaced offset from the plane of the side bars for feeding a strip to be cut over the central portion and between the parallel edges defined by the ears of the side bars, a tongue-like structure extending from one end of the central portion and having outside cutting edges, means to relatively move the template and the blade on the pivotal connection to pass the outside cutting edges on the tongue of the blade in contact with the inside cutting edges of the template and thereby cut a strip of material from side to side forming a tongue on one part of the severed strip having the shape in outline of the complementary cutting edges of the template and of the tongue of the blade.

2. In a device as described and claimed in claim 1, the tongue of the blade having a pair of notches on opposite sides adjacent the portion of the cutting edge of the tongue of the blade positioned adjacent the side edges of the opening of the template, the cutting edges of the template and the tongue of the blade being symmetrical as regards the longitudinal center through the template and the blade whereby when a strip of material is fed over the central portion of the blade and engaged by the cutting edges of the template and the tongue of the blade, such strip is severed from side to side forming a tongue on the strip symmetrical with the longitudinal axis of the strip.

3. A film cutter comprising in combination a template having an inside opening defined in part by side bars having means forming parallel guide edges and having side arms with inside cutting edges, a cutter blade assembly including a central portion and a cutting or shearing tongue, the central portion being pivoted to a pivoting means connecting with the side bars of the template, the central portion of the blade assembly having a plane surface, a spring means to normally maintain the blade and the template in an open position whereby a film placed on the central portion of the blade assembly is offset to one side of the inside cutting edges of the template and means for rotating the blade assembly on its pivot relative to the template to force the cutting tongue through the film with its cuting edge developing a shearing action in relation to the inside cutting edges of the template.

4. A film cutter as claimed in claim 3, the side bars of the template having the parallel guide edges and the side arms of the template having the inside cutting edges, each being in planes forming an obtuse angle one with the other, the cutter blade assembly having the cutting tongue formed with its upper surface on a convex curve considered longitudinally whereby the cut is produced in a progression from the portion of the cutting tongue adjacent the central portion of the cutter blade assembly towards the remote end of the cutting tongue.

5. A film cutter comprising in combination a template having an inside opening defined in part by side bars, each having downturned parallel ears forming parallel guide edges and having side arms with inside cutting edges, the said edges being in a plane, a cutter blade assembly including a central portion having downturned ears complementary to the ears of the template and fitting closely contiguous thereto, a pintle extending through the sets of ears and positioned offset from the central portion of the cutter blade assembly, such cutter blade assembly having a cutting or a shearing tongue extending from the central portion to co-act with the inside cutting edges of the template, means to retain the cutter blade assembly and the template in a relatively open position prior to making a cut whereby a strip of film may be located on the central portion of the cutter blade assembly between the parallel guide ears of the template and project between the side arms of the platen and the cutting tongue of the blade assembly and means to rotate the cutter blade assembly relative to the template on the pintle to force the cutting tongue in a shearing action through the film and past the inside cutting edges of the template.

6. In a device as described, a template having inside parallel guide edges for a film, inside shearing edges in the same plane terminating at an apex, such edges being symmetrical as regards the longitudinal center of the template, a blade assembly having a pivotal connection to the guide edges, the pivot being offset from the plane of the cutting edges of such template, the blade having a tongue with outside cutting edges complementary to the inside cutting edges of the template, the blade and the blade tongue forming a surface for guiding a film to be severed longitudinally of the blade and the template, the cutting edges of the template being V shaped with the apex in the longitudinal center, the outside cutting edge of the tongue of the blade also being V shaped to correspond with the cutting edges of the template and the surface of the tongue over which the film passes being convex.

7. In a device as described, a template having inside parallel guide edges for a film, inside shearing edges in the same plane terminating at an apex, such edges being symmetrical as regards the longitudinal center of the template, a blade assembly having a pivotal connection to the guide edges, the pivot being offset from the cutting edges of such template, the blade having a tongue with outside cutting edges complementary to the inside cutting edges of the template, the blade and the blade tongue forming a surface for guiding a film to be severed longitudinally of the blade and the template.

DAVID PAUL SHULL.